United States Patent [19]

Diry

[11] Patent Number: 4,510,051

[45] Date of Patent: Apr. 9, 1985

[54] FILTER DESIGNED FOR THE SIMULTANEOUS FILTRATION AND PREHEATING OF THE FUEL

[76] Inventor: Andre Diry, Lotissement en Boussoy, Saint Martin Sous Mointaigu (Saone et Loire), France

[21] Appl. No.: 286,238

[22] Filed: Jul. 23, 1981

[30] Foreign Application Priority Data

Jul. 24, 1980 [FR] France .............................. 80 16629

[51] Int. Cl.³ .................................................. B01D 35/18
[52] U.S. Cl. ..................................... 210/94; 210/185; 210/186; 210/416.4
[58] Field of Search ............ 210/184, 185, 186, 416.4, 210/416.5, 444, 345, 86, 95, 149, 84, 114, 104, 90, 94; 123/196 AB, 142.5 E, 557; 165/51; 55/219, 274; 116/110

[56] References Cited

U.S. PATENT DOCUMENTS

| | | | |
|---|---|---|---|
| 1,601,503 | 9/1926 | Munro | 210/416.4 |
| 1,613,507 | 1/1927 | Feely | 210/95 |
| 1,623,074 | 4/1927 | Tartrais | 123/557 |
| 1,806,553 | 5/1931 | Babitch | 210/186 |
| 1,981,397 | 11/1934 | Tabozzi | 210/444 |
| 2,073,847 | 3/1937 | Miller | 210/184 |
| 2,337,893 | 12/1943 | Hutterer | 210/444 |
| 2,432,475 | 12/1947 | Griffith | 210/184 |
| 2,472,717 | 6/1949 | Morey | 210/184 |
| 2,635,759 | 4/1953 | Schwalge | 210/184 |
| 2,672,239 | 3/1954 | Baril | 210/186 |
| 2,946,445 | 7/1960 | Tursky | 210/345 |
| 3,105,042 | 9/1963 | Roosa | 210/94 |
| 3,235,084 | 2/1966 | King et al. | 210/149 |
| 4,010,101 | 3/1977 | Davey | 210/86 |
| 4,059,520 | 11/1977 | Roller | 210/184 |
| 4,321,136 | 3/1982 | Matsui | 210/186 |

FOREIGN PATENT DOCUMENTS

| | | | |
|---|---|---|---|
| 592183 | 7/1925 | France | 210/86 |
| 796664 | 4/1936 | France | 210/184 |
| 192009 | 1/1923 | United Kingdom | 210/184 |

*Primary Examiner*—Ivars Cintins
*Attorney, Agent, or Firm*—Remy J. VanOphem

[57] ABSTRACT

The invention pertains to a filter designed for the simultaneous filtration and preheating of the fuel for an internal combustion engine.

The filter barrel houses an annular filtering element through which the fuel generally circulates in a radial direction. Heating elements are provided in an axial tube of the barrel housing and inside an external annular chamber of that same barrel. Electrical resistors, for example, may be used as heating elements.

The invention is designed to eliminate the paraffin flakes which appear in the fuel oil at low temperatures.

15 Claims, 8 Drawing Figures

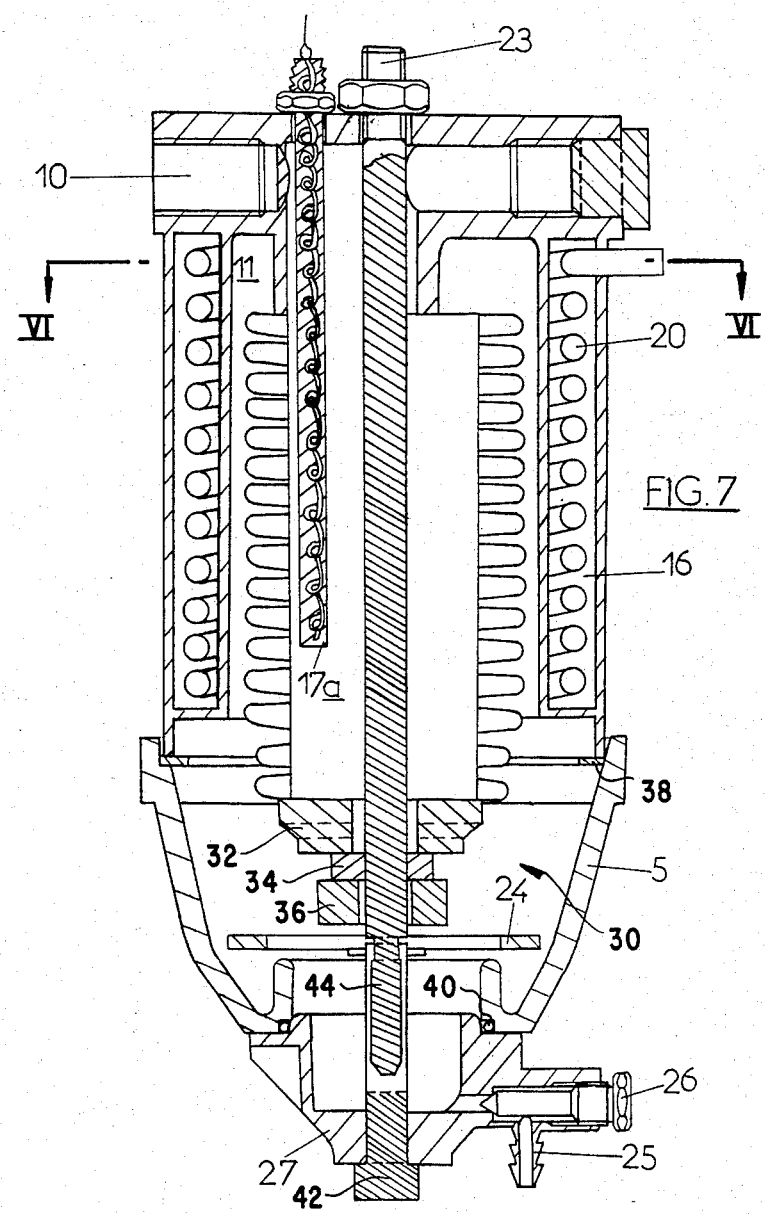

FILTER DESIGNED FOR THE SIMULTANEOUS FILTRATION AND PREHEATING OF THE FUEL

BACKGROUND OF THE INVENTION

The present invention pertains to a new type of filter designed for the simultaneous preheating and filtration of the fuel injected in an internal combustion engine.

The invention applies more specifically to Diesel engines which consume fuel oil. The fuel oil obtained with the present refining processes has a high paraffin content. The congelation of the fuel oil occurs between 0° C. and −2° C., depending on the source of the fuel oil.

Since the congelation point of the fuel oil is close to 0° C., a very common temperature during the winter season, it is the frequent cause of difficult starts of Diesel engines and the problems encountered with the fuel system during the operation of trucks and public work equipment.

It should be noted that these problems become pronounced after the prolonged storage of a Diesel engine vehicle at low ambient temperature. Under these conditions, the fuel oil system contains a significant amount of paraffin flakes or crystals which have a tendency to cake when the flow is interrupted by a barrier that they cannot clear. The filter and prefilter of the fuel oil constitute two barriers which, due to their functions, prevent the free flow of fuel oil as soon as the flakes have caked in front of the filtering element. As a result, the load drops significantly and does not allow the minimum flow of fuel required to feed the injection pump.

SUMMARY OF THE INVENTION

The present invention is designed to eliminate the above disadvantages by reducing the paraffin cakes which prevent the smooth start of the engine, as well as to insure the smooth operation of the equipment in cold weather.

The invented filter, designed for the filtration and the preheating of the fuel prior to its injection in an internal combustion engine, includes a barrel which houses an annular filtering element through which the fuel generally flows in a radial direction. It is characterized by the fact that heating elements are provided in the axial duct of the barrel and inside the external wall of the barrel.

According to another embodiment of the invention, at least one of the heating elements consists of an electrical resistor.

According to another embodiment of the invention, the electric feeding system of the resistor includes a thermostatic switch which is sensitive to the fuel temperature.

According to another embodiment of the invention, the electrical resistor may be energized either by the low voltage electrical system of a vehicle, or by the electrical supply system of a building.

According to a variation of the invention, at least one of the heating elements consists of a copper coil which allows the radiator hot water to circulate within the filter.

According to another variation of the invention, at least one of the heating elements consists of a stainless steel coil allowing the engine exhaust fumes to circulate within the filter.

According to another variation of the invention, at least one of the heating elements consists of a copper tube which crosses the filter barrel in the axial direction, thus allowing the hot water of the radiator to circulate within the filter barrel.

According to another variation of the invention, at least one of the heating elements is made of a stainless steel tube which crosses the filter barrel in the axial direction so as to allow the exhaust fumes to circulate within the filter.

BRIEF DESCRIPTION OF THE DRAWINGS

The attached, schematic drawing will give a better understanding of the invention.

FIG. 7 is a view similar to FIG. 3 but illustrating an alternate embodiment.

DETAILED DESCRIPTION OF THE PREFERRED EMBODIMENT

Figure 1:
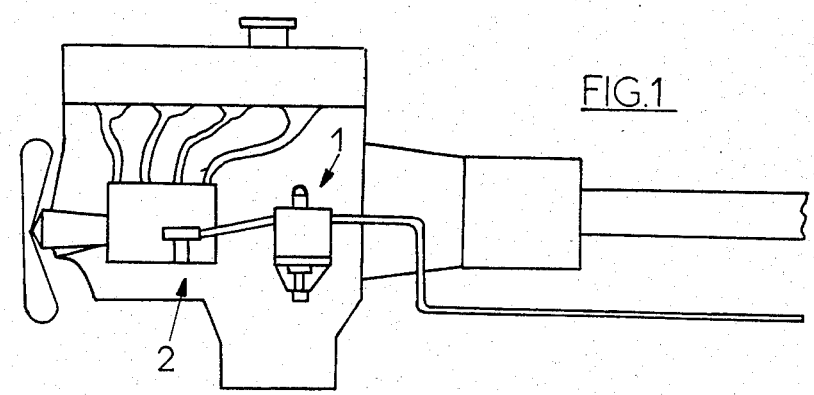
FIG. 1 is a schematic lateral view of an engine equipped with a filter constructed according to the present invention.

FIG. 1 illustrates a Diesel engine equipped with a filter 1 according to the present invention and which replaces the prefilter and filter mounted on a fuel oil injection systems. The filter 1 includes a quick connection feature allowing for its installation on the piping located between the injection pump 2 and the fuel tank.

Figure 2:
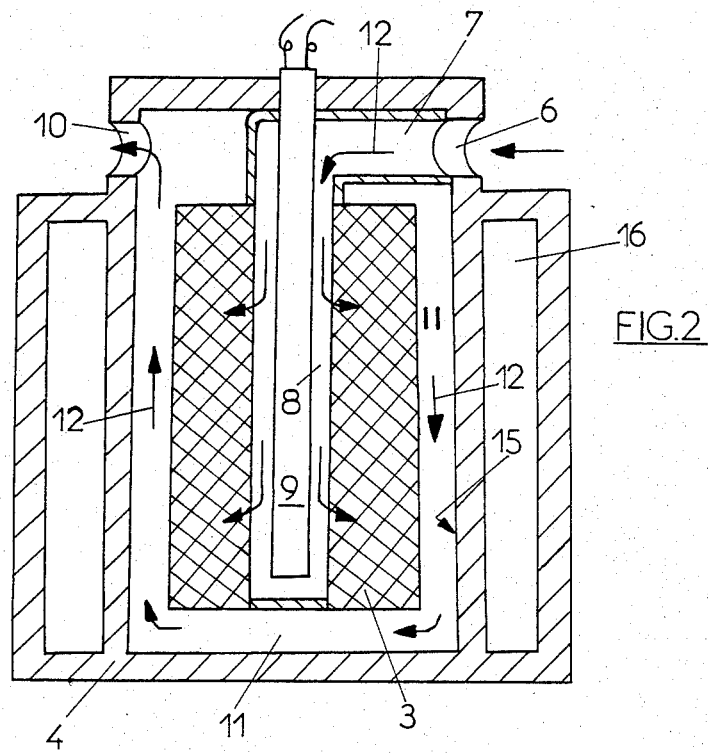
FIG. 2 is a vertical cross-section of the filter of FIG. 1 and representing a vertical, schematic cross-section of that filter.
Figure 3:
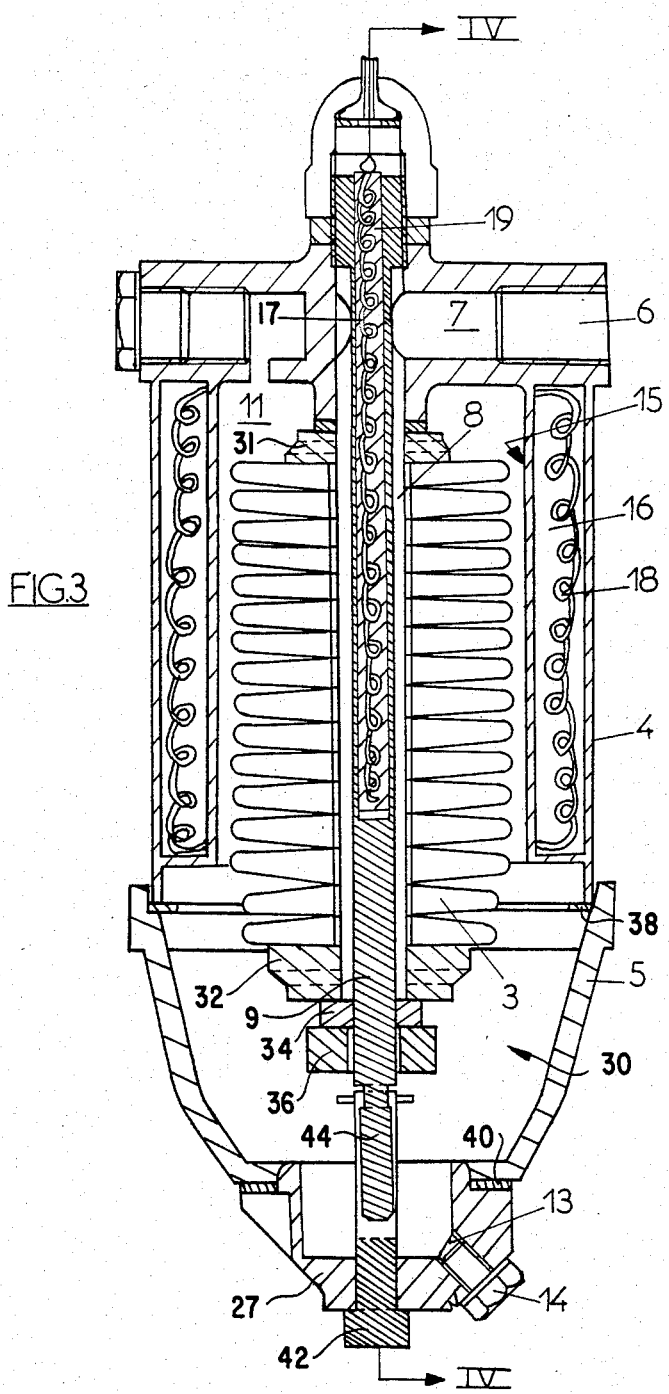
FIG. 3 is a section along line III—III of FIG. 4.

With reference to FIGS. 2 and 3 filter 1 includes a barrel housing 4 which houses an annular filtering element 3. This filtering element is thin enough to replace the filters initially mounted on the engine, and can be removed from the bottom. The main recess of the barrel housing 4 is sealed by means of a lower cover 5 which should preferably be made of transparent glass. The ease of access to the filtering element is desirable in order to facilitate its replacement, and to eliminate the accumulated dirt, etc.

Figure 4:
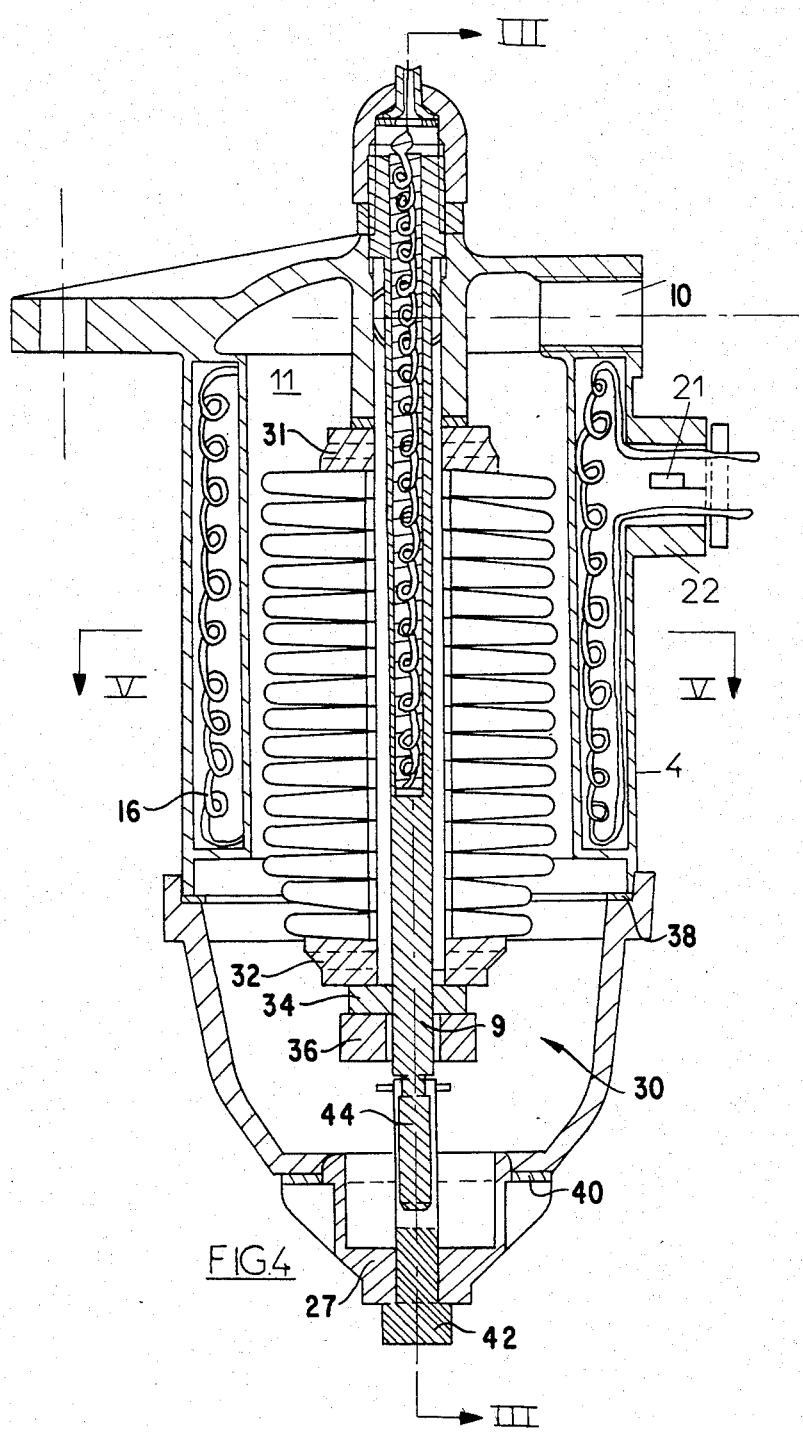
FIG. 4 is a section along line IV—IV of FIG. 3.

Securing and sealing means 30 are provided, as shown in FIGS. 3, 4 and 7, to secure both the filtering element 3 and the cover 5 with respect to the barrel 4. The top and bottom ends of the filtering element 3 are positioned, secured and sealed against respective top and bottom annular filter end caps 31 and 32 disposed about the central clamping tube 9. The periphery of the central clamping tube 9 and the bottom of annular conduit 8 thereabout are sealed by an annular sealing member 34 which is urged upwards by a nut 36 to seat and seal against the bottom annular filter end cap 32, the nut 36 being suitably engaged by the central clamping tube 9. The cover 5 is clamped and sealed at a seal 38 against the lower end of the barrel housing 4 by a clamping piece 27 which in turn is seated and sealed to the cover 5 at a seal 40. A clamp piece securing member 42 is centrally disposed through the clamping piece 27 to suitably engage the lower end 44 of the central clamping tube 9.

The inlet aperture 6 of the filter opens into a radial circuit provided at the bottom of the barrel housing 4. The radial tubing 7 opening itself into an annular conduit 8 limited by the axial, cylindrical passage of the filtering element 3, and the central clamping tube 9.

Figure 6:
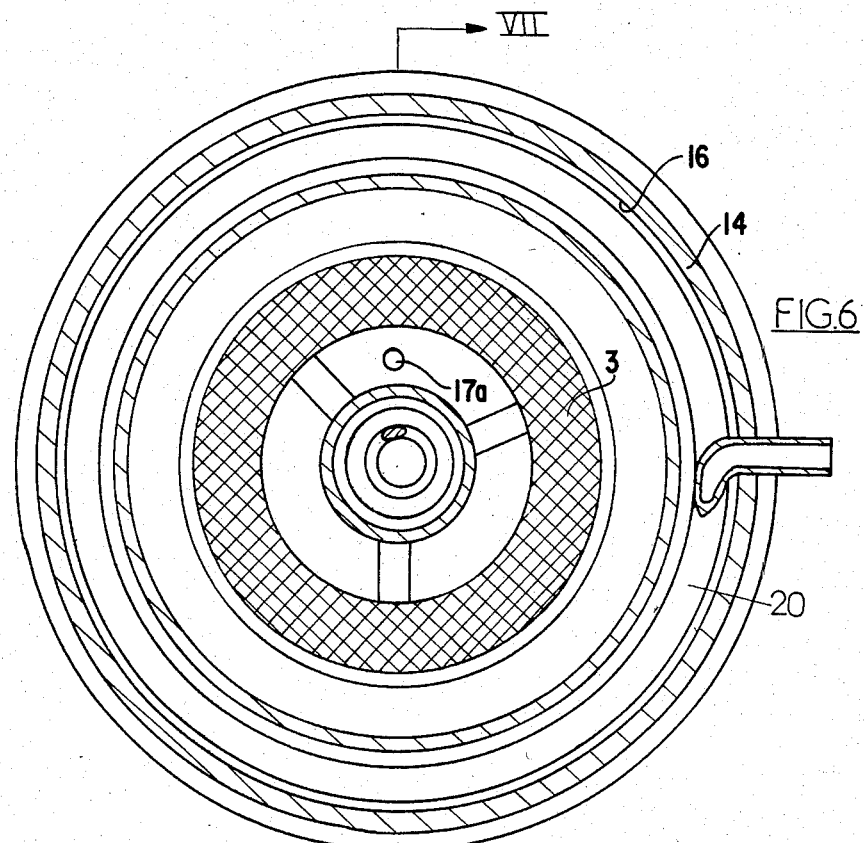
FIG. 6 is a section along line VI—VI of FIG. 7

The outlet hole 10 of the filter directly opens into the main recess 11 of the barrel housing 4, following a radial direction offset in a 90° angle with reference to the inlet aperture as shown in FIGS. 3 and 4 6.

This popular, overall arrangement leads to the fuel oil flow illustrated by the arrows 12 on FIG. 2.

A bleed hole 13, (FIG. 3) opening into the main recess 11 at the level of the cover is normally sealed by the plug 14, and is provided for the drainage of the water remaining in the system. The cover 5 may also include a degassing hole which has not been shown in FIG. 3 and which is designed to act as a safety valve for the electrical system, in case the pressure should build up due to an overheating of the fuel oil.

Figure 5:
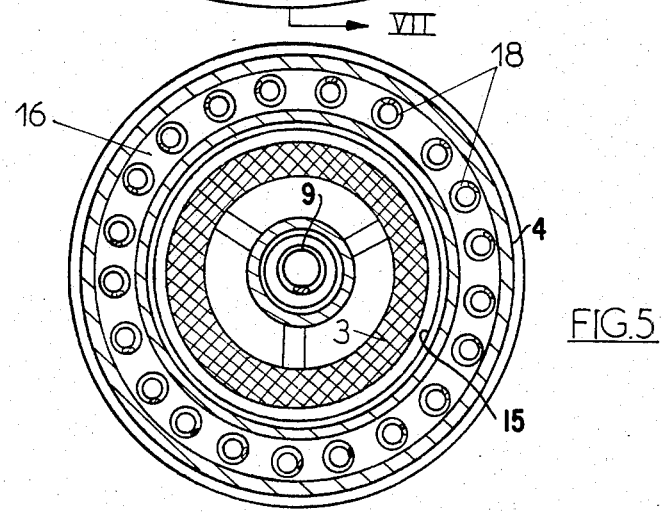
FIG. 5 is a cross section along line V—V of FIG. 4

According to the invention, the filter includes several heat exchange surfaces designed to heat the fuel oil between the tank of the vehicle and the injection pump. These surfaces consists of the external surface of tube 9 on the one hand, and of the internal cylindrical surface 15 of the housing 4 on the other hand. In addition to the above, the heating elements 17 and 18 are provided, respectively, inside the tube 9 and in an external annular chamber 16 of the barrel housing 4. In the example illustrated by FIGS. 3 through 5, these heating elements 17 and 18 are electrical resistors 17 and 18. The resistor 17 is of the "pencil" type, whereas the resistor 18 is coiled. Both of these resistors are surrounded by a highly thermoconducting metal powder 19.

Resistors fed by a 12 Volt, direct current, such as those used on a vehicle, or resistors fed by a 220 Volt, alternating current, such as those used with the alternating current of a building, may be used. In the second case, a possibility is thus offered to preheat the fuel oil when starting the vehicle, without discharging the batteries of the vehicle, which represents a significant advantage.

In the example illustrated by FIGS. 6 and 7, the heating element placed inside the annular chamber 16 consists of a coil 20. It is possible to use either a copper coil inside which the engine coolant is circulated, or a stainless metal coil through which the exhaust fumes are circulated.

Figure 8:
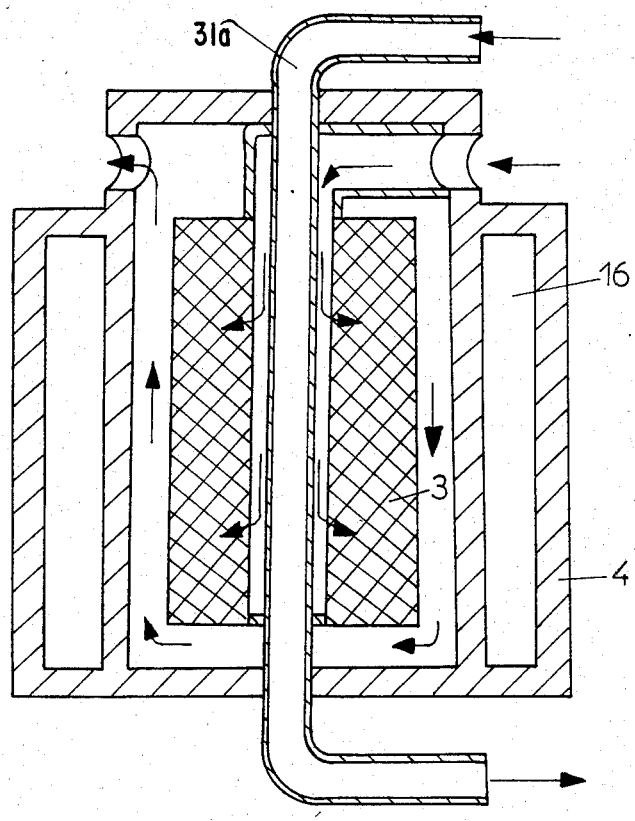
FIG. 8 is an axial schematic view of a filter, according to another embodiment of the invention.

In the example illustrated by FIG. 8, the heating element placed inside the tube 9 consists of a pipe 31a within which either the coolant, or the exhaust fumes are allowed to circulate.

In general, the filter may be preheated by a combination of various sources of heat to be found either on the vehicle itself (secondary battery, coolant, exhaust fumes), or outside the vehicle (building's main power system, etc.). Some of these sources are used for the start-up only, whereas the others are continuously used.

It is desirable to use a thermostat 21 to regulate the temperature of the fuel oil inside the barrel housing 4 so that the temperature does not significantly differ from 20° C., this temperature being an ideal filtering temperature. The thermostat 21 may be located on one side of the barrel housing as shown in FIG. 4, in the recess 22 generally used for the connection of the electric resistor terminals. When the engine coolant or the gas exhaust system are used as a source of heat, the electrical thermostat is replaced by a thermostatic valve acting on the portion through which the coil fluids circulate.

OPERATION

The system operates as follows:

Following the preheating operation, the fuel oil may be perfectly filtered, since the fuel oil heat at the level of the filter is sufficient to completely eliminate the paraffin flake accumulation. The paraffin flakes melt as the fuel oil flows through the filter at the start, and as long as the engine operates. It should be noted that the invented filter operates at those temperatures where the fuel oil is only congealed, that is, when a sufficient quantity of liquid remains in the pipes to circulate through relatively large sections, and where paraffin flakes obturate the very thin pores of the filtering elements.

Any detailed modification would still remain part of the field of the invention, when brought to the same basic structure.

For example, it is possible to slightly move the "pencil" resistor by housing it inside the main recess 11, as shown at 17a in FIG. 7, at a distance from the central clamping tube 23. This arrangement allows for an easier removal of the resistor.

It is also possible to place a bright colored washer 24, as shown in FIG. 7 red for instance, inside the cover 5. The specific weight of this washer should be between that of the water and that of the fuel oil, so as to enable the washer to float at the separation surface between the liquids, and in order to visually indicate the presence of water.

In order to help drain the water, a bleed hole 25 sealed by a screw 26 could be provided.

Finally, the barrel housing 4 of the device should preferably be made of aluminum, whereas the clamping piece 27, representing the lower section of the cover, is made of polycarbonate.

While the invention has been described in connection with the preferred embodiments, it is to be understood that this description is not intended to be limited with respect to those embodiments. On the contrary, it is intended to cover all alternatives, modifications and equivalents, as may be included in the spirit and scope of the invention as defined by the appended claims.

What is claimed is:

1. A fuel filter apparatus for heating fuel and filtering from said fuel particulate contaminants and remaining contaminants heavier than fuel prior to injecting said fuel into a combustion chamber of an internal combustion engine, said fuel filter apparatus comprising:
    a barrel housing having an upper end and a lower end;
    a first chamber in said barrel housing;
    inlet passage means into said barrel housing at said upper end thereof, said inlet passage means further having an inlet aperture at one end thereof for interconnection with a source of fuel and an outlet aperture at the opposite end thereof opening into said first chamber in said barrel housing;
    a transparent cover member removably mounted at said lower end of said barrel housing;
    a collecting chamber formed in said transparent cover member and interposed between said transparent cover member and said first chamber of said barrel housing and communicating with said first chamber;
    indicator means located in said collecting chamber comprising an indicator member having a specific gravity greater than that of said fuel;
    means for securing and sealing said transparent cover member to said barrel housing so that said transparent cover member and said barrel housing together define a leakproof assembly;

an annular filtering element positioned in said first chamber in said barrel housing, said annular filtering element having one end mounted adjacent to said outlet aperture of said inlet passage means of said barrel housing and further having an opposite end adjacent to said means for securing and sealing said transparent cover member;

a vertically disposed central passage in said annular filtering element having a first end and an oppositely disposed second end, said central passage communicating at said first end with said outlet aperture of said inlet passage means of said barrel housing and being sealed at said second end by said means for securing and sealing said transparent cover member such that said annular filtering element divides said first chamber into a first portion comprising said central passage and communicating with said inlet passage means and an outer annular portion external of said annular filtering element and communicating with said collecting chamber whereby fuel flows from said central passage to said outer annular portion through said annular filtering element;

an outlet passage means in said barrel housing at said upper end thereof, said outlet passage means further having an inlet aperture at one end thereof opening into said outer annular portion of said first chamber and an outlet aperture at the opposite end thereof, such that said fuel entering said inlet aperture of said inlet passage means flows through said inlet passage means into said central passage of said annular filtering element and through said annular filtering element into said outer annular portion of said first chamber and through said outlet passage means to said outlet aperture thereof, said annular filtering element removing the undesired particulate contaminants from said fuel so that said fuel cleaned by said annular filtering element flows into said outer annular portion of said first chamber; and means for heating said fuel flowing through said fuel filter apparatus, said heating means heating said fuel in said annular portion of said first chamber to melt any paraffin in said fuel, said remaining contaminants heavier than said fuel settling into said collecting chamber, said heated and filtered fuel thereafter flowing through said outlet passage of said outer annular portion of said first chamber.

2. The fuel filter apparatus as claimed in claim 1, further comprising drainage means in said transparent cover member for draining said remaining contaminants from said collecting chamber, said drainage means being mounted to said transparent cover member such that said contaminants collected in said collecting chamber may be drained from said collecting chamber to permit continuous operation of said fuel filter apparatus.

3. The fuel filter apparatus as claimed in claim 1, further comprising thermostat means for regulating the fuel temperature of said fuel in said fuel filter apparatus so that said fuel temperature does not differ significantly from a predetermined temperature.

4. The fuel filter apparatus as claimed in claim 1 wherein the said means for heating further comprises a stainless steel coil circulating exhaust gases from said internal combustion engine therethrough.

5. The fuel filter apparatus as claimed in claim 1 further comprising thermostatic switch means controlling said means for heating, said switch means being mounted in said barrel housing adjacent said annular portion in said first chamber so as to be responsive to the fuel temperature of the fuel which has already flowed through said annular filtering element.

6. The fuel filter apparatus as claimed in claim 1 wherein said indicator member has a specific weight between that of said contaminants collected in said transparent cover member and that of said fuel.

7. The fuel filter apparatus of claim 1 wherein said means for securing and sealing comprises an elongated securing member extending from said transparent cover member to said barrel housing and further wherein said indicator member comprises an annular member reciprocably disposed about said elongated securing member.

8. The fuel filter apparatus as claimed in claim 1 wherein said means for heating said fuel comprises an external annular chamber surrounding said outer annular portion of said first chamber and a coolant pipe disposed in said central passage, said fuel being heated by circulating engine coolant in said external annular chamber and said coolant pipe disposed in said vertically disposed central passage of said annular filtering element.

9. The fuel filter apparatus as claimed in claim 1 wherein said means for heating said fuel comprises an external annular chamber surrounding said outer annular portion of said first chamber; an electrical resistance heating element located in said external annular chamber; and a second electrical resistance heating element disposed in said central passage of said annular filtering element such that said electrical resistance heating elements heat said fuel flowing through said fuel filter apparatus.

10. A fuel filter apparatus for heating fuel and filtering from said fuel particulate contaminants and remaining contaminants heavier than fuel prior to injecting said fuel into a combustion chamber of an internal combustion engine, said fuel filter apparatus comprising:

a barrel housing having an upper end and a lower end;

a first chamber in said barrel housing;

inlet passage means into said barrel housing at said upper end thereof, said inlet passage means having an inlet aperture at one end thereof for interconnection with a source of fuel and an outlet aperture at the opposite end thereof opening into said first chamber in said barrel housing;

a cover member removably mounted at said lower end of said barrel housing;

a collecting chamber formed in said cover member and interposed between said cover member and said first chamber of said barrel housing and communicating with said first chamber;

means for securing and sealing said cover member to said barrel housing so that said cover member and said barrel housing together define a leakproof assembly;

an annular filtering element positioned in said first chamber in said barrel housing, said annular filtering element having one end mounted adjacent to said outlet aperture of said inlet passage means of said barrel housing and further having an opposite end adjacent to said means for securing and sealing said cover member;

a vertically disposed central passage in said annular filtering element having a first end and an oppositely disposed second end, said central passage communicating at said first end with said outlet aperture of said inlet passage means of said barrel housing and being sealed at said second end by said means for securing and sealing said cover member such that said annular filtering element divides said first chamber into a first portion comprising said central passage and communicating with said inlet passage means and an outer annular portion external of said annular filtering element and communicating with said collecting chamber whereby fuel flows from said central passage to said outer annular portion through said annular filtering element;

an outlet passage means in said barrel housing at said upper end thereof, said outlet passage means further having an inlet aperture at one end thereof opening into said outer annular portion of said first chamber and an outlet aperture at the opposite end thereof, such that said fuel entering said inlet aperture of said inlet passage means flows through said inlet passage means into said central passage of said annular filtering element and through said annular filtering element into said outer annular portion of said first chamber and through said outlet passage means to said outlet aperture thereof, said annular filtering element removing the undesired particulate contaminants from said fuel so that said fuel cleaned by said annular filtering element flows into said outer annular portion of said first chamber;

a first heating means mounted in said barrel housing, said first heating means having one end extending outside of said barrel housing and an other opposite end extending into said central passage, such that said fuel entering said inlet passage means is heated in said central passage before it flows through said filtering element;

an annular second chamber in said barrel housing disposed generally concentrically about said outer annular portion of said first chamber; and a second heating means provided in said annular second chamber such that said fuel flowing through said annular filtering element and entering said outer annular portion of said first chamber is heated in said outer annular portion of said first chamber before it flows through said inlet aperture of said outlet passage means; said remaining contaminants heavier than said fuel settling into said collecting chamber.

11. The fuel filter apparatus as claimed in claim 10, further comprising drainage means in said cover member for draining said remaining contaminants from said collecting chamber, said drainage means being mounted to said cover member such that said contaminants collected in said collecting chamber may be drained from said collecting chamber to permit continuous operation of said fuel filter apparatus.

12. The fuel filter apparatus of claim 10 wherein one of said first and second heating means comprises electrical resistance means for heating said fuel while said engine is being started and wherein the other of said first and second heating means comprises hollow coil means for circulating a preheated fluid therethrough after said engine has started.

13. The fuel filter apparatus as claimed in claim 10 wherein said first heating means comprises a coolant pipe disposed in said central passage and engine coolant circulating therethrough and further wherein said second heating means comprises engine coolant such that said fuel flowing through said fuel filter apparatus is heated by said engine coolant.

14. The fuel filter apparatus as claimed in claim 10 wherein said first and second heating means further comprises electrical resistance heating elements mounted in said first and second heating means respectively such that said fuel flowing through said fuel filter apparatus is heated thereby.

15. The fuel filter apparatus as claimed in claim 10 wherein said first heating means comprises a coolant pipe disposed in said central passage and exhaust gases circulating therethrough and further wherein said second heating means comprises exhaust gases such that said fuel flowing through said fuel filter apparatus is heated by said exhaust gases.

* * * * *

UNITED STATES PATENT AND TRADEMARK OFFICE
CERTIFICATE OF CORRECTION

PATENT NO. : 4,510,051
DATED : April 9, 1985
INVENTOR(S) : Andre Diry

It is certified that error appears in the above-identified patent and that said Letters Patent is hereby corrected as shown below:

Column 1, line 37, "cakes" should resd -- flakes --.

Column 3, line 22, "the housing" should resd -- the barrel housing --.

Signed and Sealed this

Twenty-first Day of January 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,510,051
DATED : April 9, 1985
INVENTOR(S) : Andre Diry

It is certified that error appears in the above-identified patent and that said Letters Patent is hereby corrected as shown below:

Column 1, line 37, "cakes" should read -- flakes --.

Column 3, line 22, "the housing" should read -- the barrel housing --.

This certificate supercedes Certificate of Correction issued January 21, 1986.

Signed and Sealed this

Seventeenth Day of June 1986

[SEAL]

Attest:

DONALD J. QUIGG

Attesting Officer

Commissioner of Patents and Trademarks